US 8,768,541 B2

(12) United States Patent
Detouillon et al.

(10) Patent No.: US 8,768,541 B2
(45) Date of Patent: Jul. 1, 2014

(54) DEVICE FOR INTERACTION WITH A DISPLAY SYSTEM, IN PARTICULAR FOR AN AVIONICS DISPLAY SYSTEM

(75) Inventors: Gregory Detouillon, Toulouse (FR); Yannick Deleris, Grenade (FR)

(73) Assignee: Airbus Operations S.A.S., Toulouse (FR)

(*) Notice: Subject to any disclaimer, the term of this patent is extended or adjusted under 35 U.S.C. 154(b) by 563 days.

(21) Appl. No.: 12/492,643

(22) Filed: Jun. 26, 2009

(65) Prior Publication Data

US 2010/0001132 A1    Jan. 7, 2010

(30) Foreign Application Priority Data

Jun. 26, 2008  (FR) ..................................... 08 54285

(51) Int. Cl.
*B64D 11/00* (2006.01)
*G06F 3/041* (2006.01)
*G08B 21/00* (2006.01)

(52) U.S. Cl.
USPC ............... 701/3; 345/156; 345/157; 345/173; 715/858; 715/246

(58) Field of Classification Search
USPC .................. 345/157, 173, 156; 715/858, 256; 701/3–18
See application file for complete search history.

(56) References Cited

U.S. PATENT DOCUMENTS

| | | | | |
|---|---|---|---|---|
| 5,157,384 A * | 10/1992 | Greanias et al. | ............... | 345/156 |
| 5,659,475 A * | 8/1997 | Brown | ........................... | 701/120 |
| 5,936,614 A * | 8/1999 | An et al. | ......................... | 345/173 |
| 6,005,579 A * | 12/1999 | Sugiyama et al. | ............ | 715/855 |
| 6,356,287 B1 * | 3/2002 | Ruberry et al. | ................ | 715/864 |
| 6,774,886 B2 * | 8/2004 | Okuda et al. | .................... | 345/157 |
| 6,784,869 B1 * | 8/2004 | Clark et al. | .................... | 345/156 |
| 6,980,198 B1 * | 12/2005 | Gyde et al. | ..................... | 345/157 |
| 7,190,351 B1 | 3/2007 | Goren | | |
| 7,212,890 B2 * | 5/2007 | Lafon et a | .......................... | 701/3 |
| 7,728,812 B2 * | 6/2010 | Sato et al. | ...................... | 345/156 |
| 7,856,603 B2 * | 12/2010 | Molgaard | ...................... | 715/835 |
| 8,009,146 B2 * | 8/2011 | Pihlaja | ........................... | 345/173 |
| 8,013,839 B2 * | 9/2011 | Ording et al. | .................. | 345/157 |
| 2003/0078840 A1 * | 4/2003 | Strunk et al. | ..................... | 705/14 |
| 2004/0010353 A1 * | 1/2004 | McConnell | ........................ | 701/3 |
| 2005/0088421 A1 | 4/2005 | Toepke et al. | | |
| 2006/0097986 A1 * | 5/2006 | Mizuno | .......................... | 345/156 |
| 2007/0055416 A1 * | 3/2007 | Allen | ................................. | 701/3 |

(Continued)

FOREIGN PATENT DOCUMENTS

| EP | 1 207 451 | | 5/2002 |
|---|---|---|---|
| EP | 1207451 A2 | * | 5/2002 |

OTHER PUBLICATIONS

U.S. Appl. No. 13/000,685, filed Dec. 22, 2010, Deleris, et al.

*Primary Examiner* — Thomas Black
*Assistant Examiner* — Sara Nelson
(74) *Attorney, Agent, or Firm* — Oblon, Spivak, McClelland, Maier & Neustadt, L.L.P.

(57) ABSTRACT

A display system in a flight deck includes at least one screen adapted for displaying several different applications and at least one cursor associated with the applications, an interaction device includes means for activation of the cursor configurable automatically according to the application displayed, and the interaction device includes a touch-sensitive screen adapted for displaying a visual representation of a control panel of a real physical system of the flight-deck.

13 Claims, 6 Drawing Sheets

(56) References Cited

U.S. PATENT DOCUMENTS

| | | | |
|---|---|---|---|
| 2007/0136681 A1* | 6/2007 | Miller | 715/782 |
| 2008/0048973 A1* | 2/2008 | McKay | 345/156 |
| 2008/0215192 A1* | 9/2008 | Hardman et al. | 701/3 |
| 2008/0231634 A1* | 9/2008 | Gyde et al. | 345/427 |
| 2009/0276637 A1* | 11/2009 | Coonan et al. | 713/300 |
| 2011/0006983 A1* | 1/2011 | Grothe | 345/157 |

* cited by examiner

DEVICE FOR INTERACTION WITH A DISPLAY SYSTEM, IN PARTICULAR FOR AN AVIONICS DISPLAY SYSTEM

BACKGROUND OF THE INVENTION

This invention relates to a flight deck with a display system, and in particular with an avionic display system implemented in an aircraft.

In modern cockpits, the display of flight information is performed on screens connected to computers, capable of working out complex information from the sensors of the airplane and from the data input by the crew, and of finalizing this information for a display.

The display system of a cockpit thus generally comprises several screens adapted for displaying several different applications.

The pilots then are led to work by means of one or more cursors on different screens, in order to indicate virtual objects on which they wish to interact.

The cursors thus are adapted for being moved over several screens and for addressing various applications, presented in window form also called format.

Each screen can comprise several windows, each window being able to present interactive elements (also called Widgets in English terminology) not all necessarily addressing the same application.

The interaction device available to the pilots generally comprises means for controlling the cursor allowing movement of the cursor within a screen and assignment of a cursor to one of the screens.

These interaction devices also comprise several activation means making it possible to activate a predefined action on a virtual object indicated by the cursor.

The interaction device can consist of a keyboard, and a control ball (trackball in English) or a touch-sensitive pad (touchpad in English) making it possible to move the cursor.

These interaction means, however, generally are physical objects the definition of control or activation functions of which is set at the time of design of the aircraft.

Now, the applications displayed on the screens are very diverse and offer a great flexibility for change in the presentation of information.

This great diversity of applications leads to very diverse needs as regards interaction at the cursor level.

It then is necessary, at the interaction device, to cover all these needs and thus to increase the buttons and the control means in the cockpit, entailing significant mental efforts for the pilots to try to find the specific control button.

Furthermore, when the applications change in time, the interaction device may not be adapted for the new needs demanded by these new applications.

It then is necessary either to add at the outset forward-looking buttons, which then must be cabled and/or programmed when a new function is assigned to them, or to develop a new interaction device and to undertake replacement of the interaction device on all the aircraft.

Finally, in the known flight decks, the interaction device is limited to the activation and the control of cursors of a display system.

SUMMARY OF THE INVENTION

This invention has as its purpose to resolve the aforementioned drawbacks and to propose a flight deck having an interaction device well adapted to the diversity of controls available to the pilot, in particular in an aircraft.

To this end, the invention relates to a flight deck comprising a display system consisting of at least one display screen suitable for displaying several different applications and at least one cursor associated with the applications; a device for interaction with the display system comprising means for activation of the said at least one cursor and means for automatic configuration of the activation means; and at least one control panel for a flight-deck system.

According to the invention, the interaction device comprises a touch-sensitive screen adapted, in a mode of interaction with the display system, for displaying means for activation of the cursor, the means for activation of the cursor being configured automatically according to the application implemented on the said at least one display screen of the display system, and, in a mode of virtual representation of a control panel, for displaying a visual representation of the said at least one control panel for a flight-deck system, an action on the touch-sensitive screen being adapted to control the flight-deck system.

The interaction device according to the invention thus can be reconfigured automatically, by being adapted to the type of application displayed on the screen on which the cursor is located.

The means for activation of the cursor, making it possible to control an application or to interact with a virtual object through the cursor, thus are reconfigured automatically.

By virtue of means for determination of the application, it is possible to adapt the configuration of the interaction device instantaneously and to offer at this interaction device only the control functions strictly necessary to the application implemented.

Furthermore, the touch-sensitive screen of the interaction device is not limited to a function of interaction with the display system but also makes it possible to offer the pilot a control panel for a flight-deck system. In this way the interaction device makes it possible to replace (in case of failure, for example), or to set up redundantly certain control panels for real physical systems present in the cockpit.

This interaction device thus offers a noteworthy simplification in its use, and a great modularity in the controls accessible to the pilot.

In practice, the means for automatic configuration are adapted for choosing the configuration of the activation means from a programmable database, storing a series of configurations of activation means associated respectively with applications of the display system.

The use of a database thus makes it possible to define a configuration of the interaction device for each application considered. As this database is programmable, the configurations stored thus can be modified or expanded by computer programming during processes of change of applications to be displayed.

The interaction device makes it possible to scale down the processes of change of applications implemented on the display system, particularly in terms of time and cost.

According to one advantageous characteristic of the invention, the means for automatic configuration are adapted for configuring a visual representation of the activation means and a function of the means for activation of the cursor.

In this way, the user of the interaction device always has clearly identifiable activation means available to him, by virtue of an updating of a visual representation of these activation means, corresponding to the function implemented in relation to the application addressed by the cursor on a screen of the display system.

In practice, the means for automatic configuration are adapted for configuring a visual representation and a function associated with the virtual keys of a virtual keyboard of the said touch-sensitive screen.

According to a second aspect, the invention also relates to an aircraft comprising a flight deck in accordance with the invention.

The ease of use and reconfiguration of the interaction device is particularly well adapted for interacting with screens of an avionic display system, for which the applications implemented can be very diverse, and in particular be chosen from among at least an EFB (acronym for the English term Electronic Flight Bag) format, a textual avionic format or a graphic avionic format.

BRIEF DESCRIPTION OF THE DRAWINGS

Other features and advantages of the invention also will become evident in the description below.

In the attached drawings, provided by way of non-limiting examples.

DETAILED DESCRIPTION OF THE INVENTION

Figure 1:
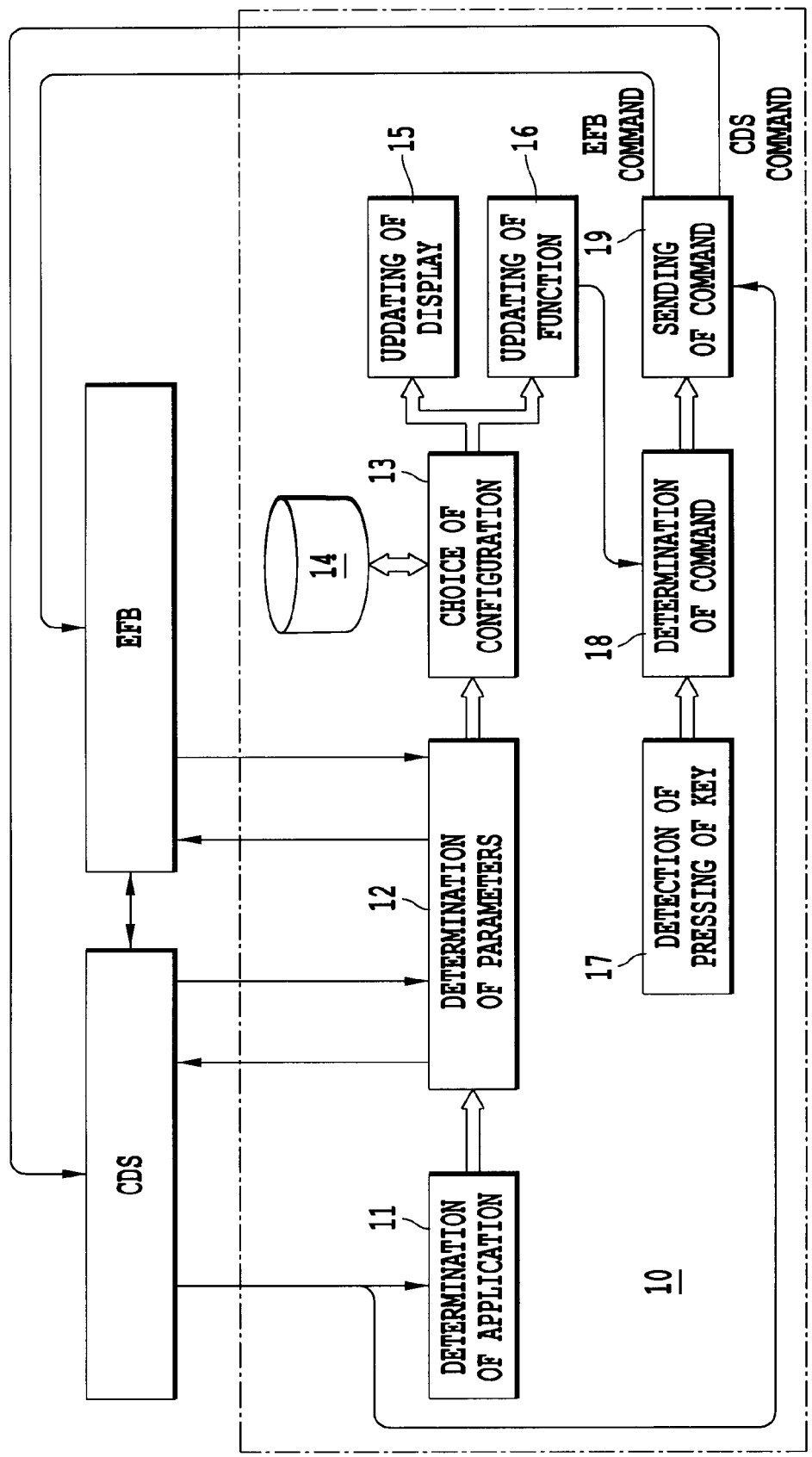
FIG. 1 is a block diagram illustrating a device for interaction with a display system implemented in an aircraft, in accordance with an embodiment of the invention.

An interaction device in accordance with one embodiment, making it possible to interact with a display system, is going to be described with reference to FIG. 1.

In this embodiment, it involves an avionic display system implemented in a flight deck or cockpit of an aircraft.

Such a display system generally comprises several screens, and in this embodiment, two screens associated respectively with an avionic system and with an information system.

More precisely, a first CDS (acronym for the English term Control and Display System) screen makes it possible to display interfaces of electronic flight instruments.

A second EFB (acronym for the English term Electronic Flight Bag) screen makes it possible, moreover, to interface a documentation and flight information computer system.

Each of these screens makes it possible to display various applications or formats according to the type of data to be presented to the user, through windows or interactive elements displayed on the screen.

Navigation in these different display formats is accomplished in conventional manner by means of a cursor.

The role and functions of this cursor are strictly linked to the type of applications displayed on each screen.

The interaction device 10 in accordance with the invention uses a technology of reconfigurable activation means, being adapted automatically to the type of formats or applications displayed on the screen on which the cursor is located.

This interaction device 10 thus comprises means for determination of an application 11 adapted for automatically recognizing the desired use.

These means for determination of an application 11 rely on the presence, at the CDS or EFB screens, of a cursor for each pilot, this cursor being generic for all types of display and allowing a basic interaction with the current display (pressing on a virtual button, indication of a graphic element, . . . ).

Management of this cursor at the display system already necessitates knowledge of the type of application or display addressed by this cursor on each screen.

The means for determination of applications 11 make it possible to retrieve this application information only by virtue of an appropriate dialogue between the display system and the interaction device 10.

The transfer of information between the display system and the interaction device 10 is accomplished by means of a digital dialogue via a bus connecting the two entities.

In practice, from the physical position of the cursor and the physical allocation of the formats on the screen, the active application (or format) can be determined.

Furthermore, the interaction device 10 also comprises means for determination of parameters 12 associated with a particular application when the type of parameters is relevant for the implementation of this application.

Such is the case in particular when different alphabets can be used for the same application.

Means for determination of parameters 12 are adapted for dialoguing with the application implemented on the display system.

As above, a digital bus connects the two entities in order to permit their dialogue.

By virtue of the determination of an application and possible associated parameters, means for choice of a configuration 13 make it possible to determine a configuration of the activation means by virtue of a database 14 in which different configurations are stored in association with the applications that can be displayed on the CDS or EFB screens.

In practice, this database 14 is analogous to a programmable correspondence table showing the different conceivable types of application and the configurations of the means for activation usable for each application.

As this database 14 can be programmable, it is possible to incorporate new definitions or configurations of the means for control of the cursor when new applications are to be handled at the display system on the CDS or EFB screens.

This database 14 thus can be modified or expanded by programming according to the change processes of the display systems and the data handled by these screens. This database moreover can have a particular configuration for each aircraft (for example a specific alphabet).

Furthermore, the screens themselves are not dedicated to one type of display but can be configured to function as a CDS screen or an EFB screen in the flight deck.

The means for choice of a configuration 13 make it possible to determine and to update a visual reproduction at the activation means for the cursor, as well as the function or the role associated with these activation means.

In non-limiting manner, these activation means can comprise physical keys or buttons of a device, but also any type of virtual interaction means, such as a virtual key, a touchpad, a slide . . . .

Modification of the visual appearance of each activation means thus makes it possible to indicate visually to the pilot the interaction role associated with the cursor positioned on an application displayed on a screen.

The interaction between the cursor and the application also is modified according to the type of applications to be adapted to the application in progress.

The interaction device thus comprises means for updating a visual representation 15 and means for updating the function 16 of each activation means.

Means for detection of actuation 17 of the activation means then make it possible to detect the actions desired by the pilot.

In practice, it can involve detecting a pressing on a physical key or a virtual key, by the presence of the user's finger.

According to the type of keys actuated, the means for determination of a command 18 make it possible, starting from the means for updating 16 of the function of each of the keys, to determine the action performed through the cursor appearing on the screen.

Means for sending 19 of a command make it possible to address this command to the virtual object indicated by the cursor, either on the CDS screen or the EFB screen.

In order to assign a cursor to a given screen, specific keys can be provided at the interaction device. It also can involve a screen wall logic, with a jump from one screen to the other by continuous moving of the cursor.

An exemplary embodiment of the different configurations of an interaction device using, in this embodiment, a touch-sensitive screen, has been illustrated on FIGS. 2 to 11.

Updating of the activation means in such a touch-sensitive screen consists in configuring different virtual keys, in their visual aspect as well as in the function associated with each of the keys.

This touch-sensitive screen can be built into a foldaway shelf located beneath the screens facing each of the pilots in the cockpit of an aircraft.

Figure 2:
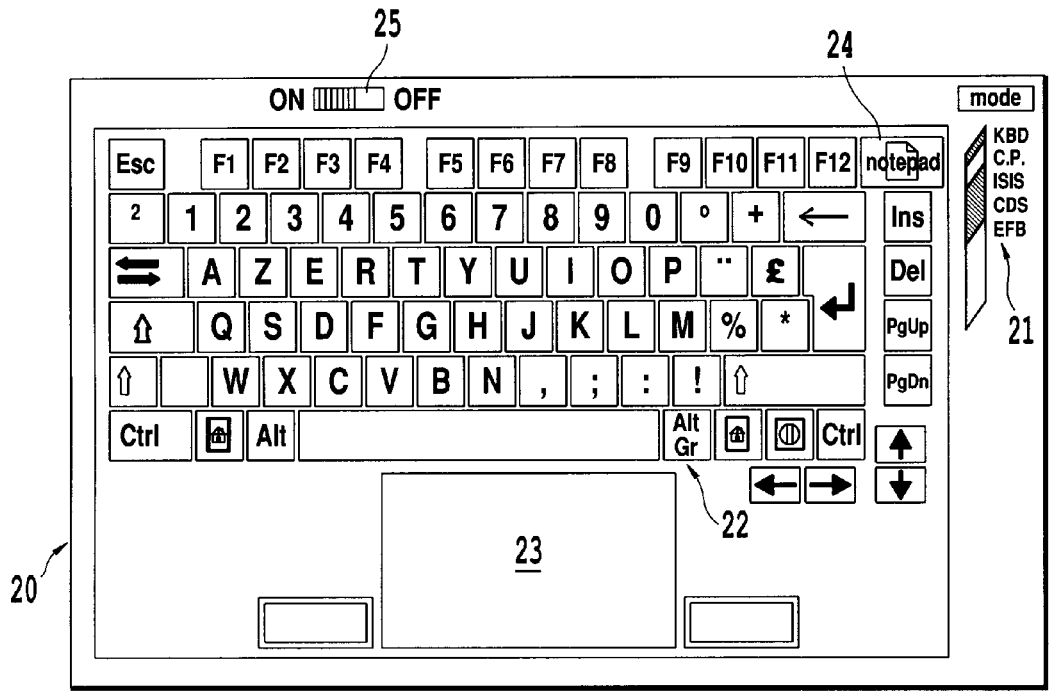
FIGS. 2 to 5 illustrate an interaction device according to an embodiment of the invention, in a mode of interaction with a display system.

As illustrated in FIG. 2, an interaction device put into use from a touch-sensitive screen makes it possible to add use modes to the interaction mode with a display system such as described previously.

This touch-sensitive screen 20 here comprises a selection button 21 making it possible to select different use modes as will be described later with reference to FIGS. 6, 7 and 9 to 11.

In the interaction mode such as illustrated in FIG. 2, the touch-sensitive screen 20 makes it possible to offer a virtual keyboard 22 as well as a touchpad 23.

The configuration of the virtual keys of the keyboard 22 is adapted visually as well as in the function used on the screen on which the cursor is located.

The configuration of these keys is adapted, as explained previously with reference to FIG. 1, to the type of applications implemented on the screen on which the cursor, controlled by the interaction device, is located.

A configuration of the command keys suitable for interacting with an EFB format has been illustrated in FIG. 2.

In this type of use, the movement of the cursor on the screen can be controlled by virtue of a touchpad 23 and functions associated with each virtual key can be implemented on each virtual object indicated by the cursor.

The configuration of the function and alphanumeric keys of this virtual keyboard 22 is adapted for addressing an EFB format, allowing navigation in a flight information and documentation system.

In this type of EFB application, parameters can be updated, and in particular the type of alphabet used.

Figure 3:
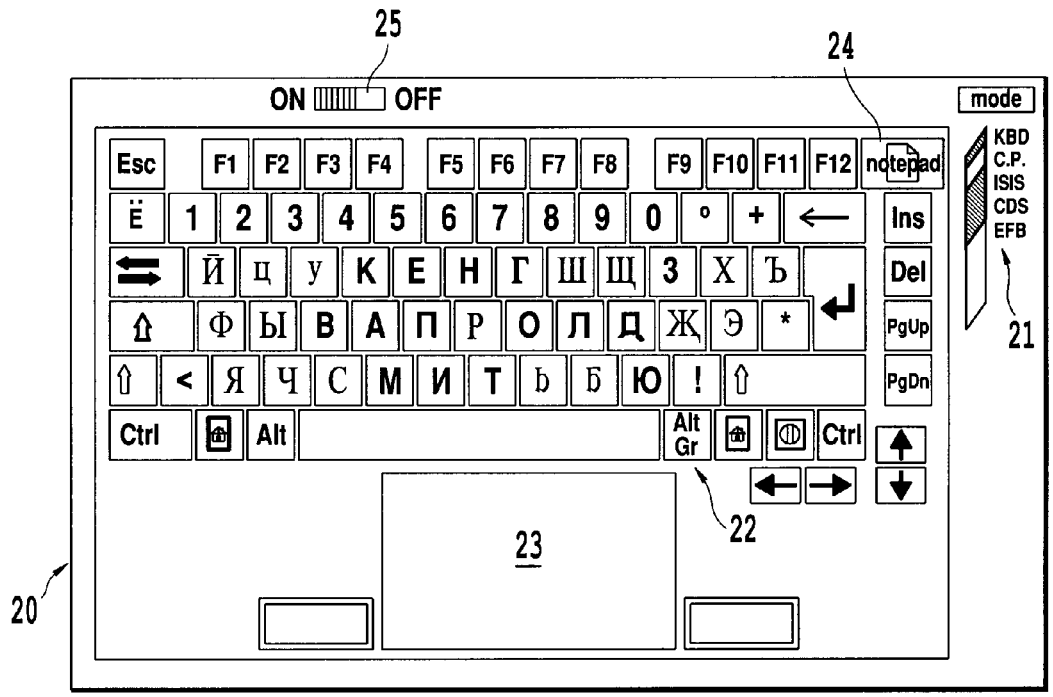

As illustrated in FIG. 3, the interaction device also can be configured in such a way that it allows use of a Cyrillic alphabet when the EFB operating system is using this type of alphabet.

Figure 4:
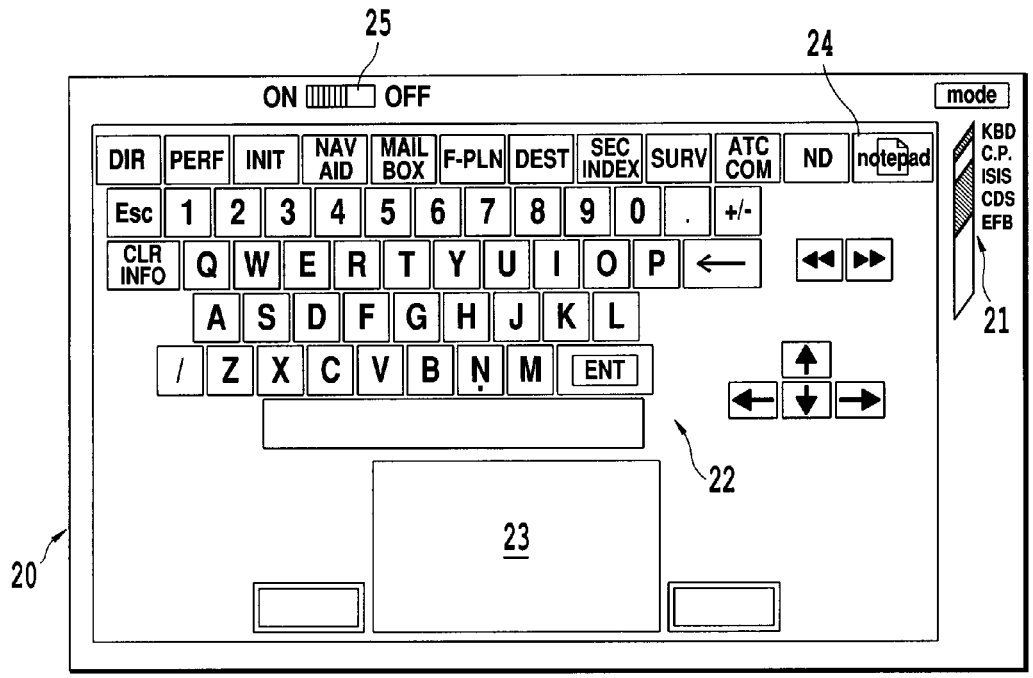
Figure 5:
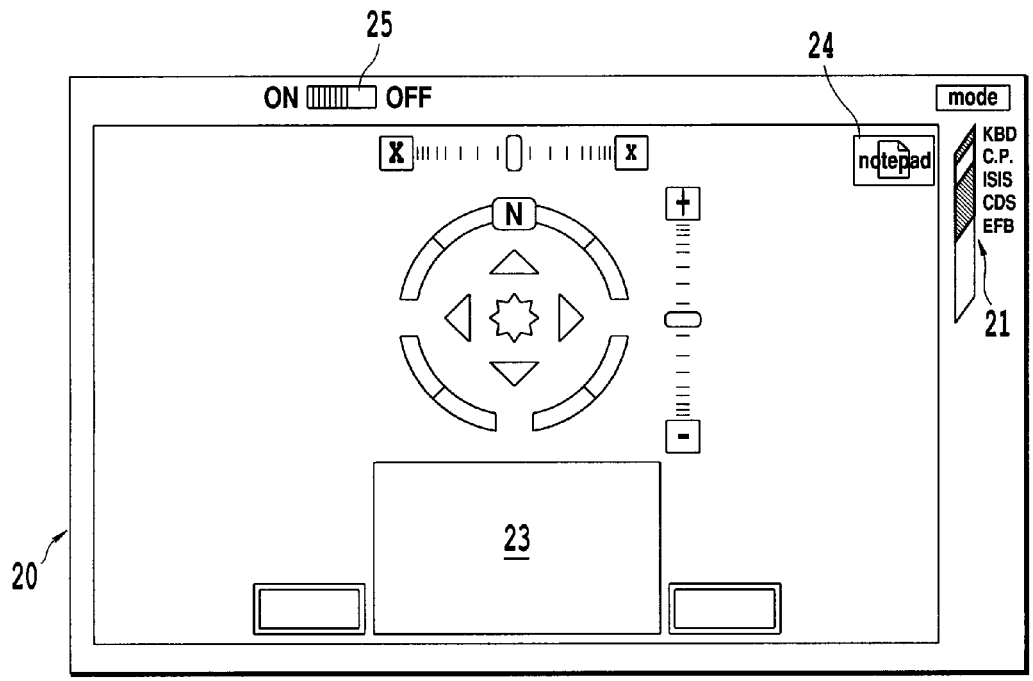

FIGS. 4 and 5 illustrate a second type of application, in which the cursor is used on a screen addressing an avionic format, making it possible to manage the electronic flight instruments.

An exemplary configuration of an interaction device making it possible to address a textual avionic format by means of a cursor on the CDS screen has been illustrated in FIG. 4.

Alternatively, in FIG. 5, the interaction device has been configured to address a graphic avionic format on the CDS screen.

The use modes for the touch-sensitive screen described previously with reference 2 to 5 correspond to an interaction device with a display system in which the touch-sensitive screen has an overall function of a keyboard, corresponding to the KBD use mode of the selection button 21.

Furthermore, the touch-sensitive screen also can be utilized in a second use mode as a virtual control panel (CP function of the selection button 21).

In this way, the touch-sensitive screen is not limited to a function of interaction with the avionic screens, but also makes it possible, by virtue of its display flexibility, to replace or set up redundantly certain dedicated control panels present in a cockpit.

Figure 6:
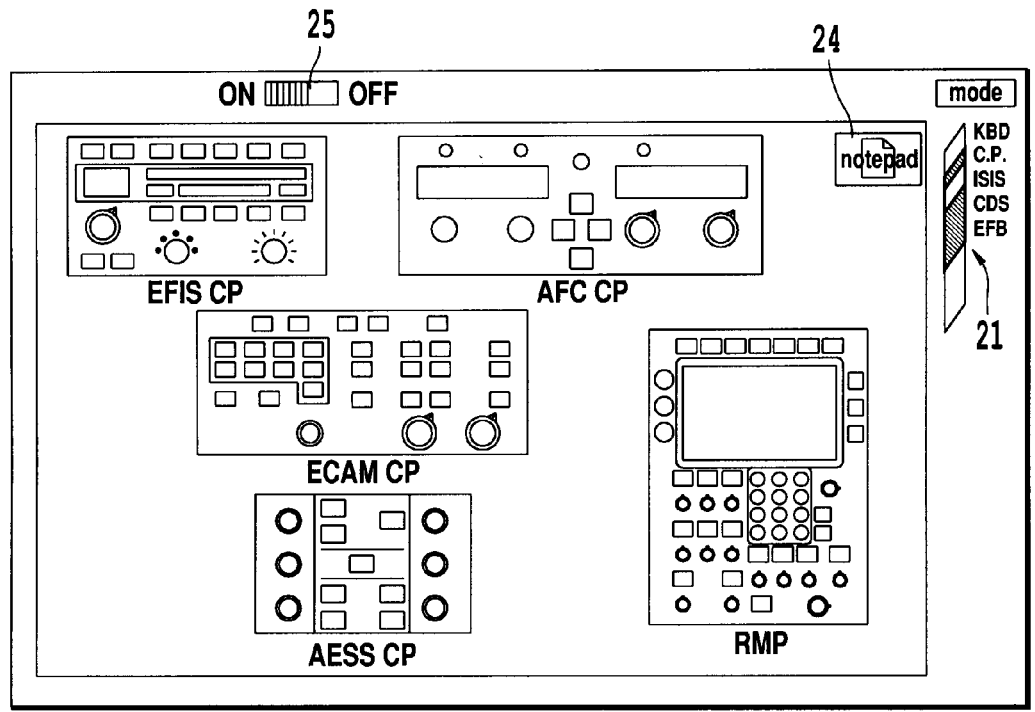
FIGS. 6 and 7 illustrate the interaction device of FIG. 2, in a mode of representation of a control panel.
Figure 7:
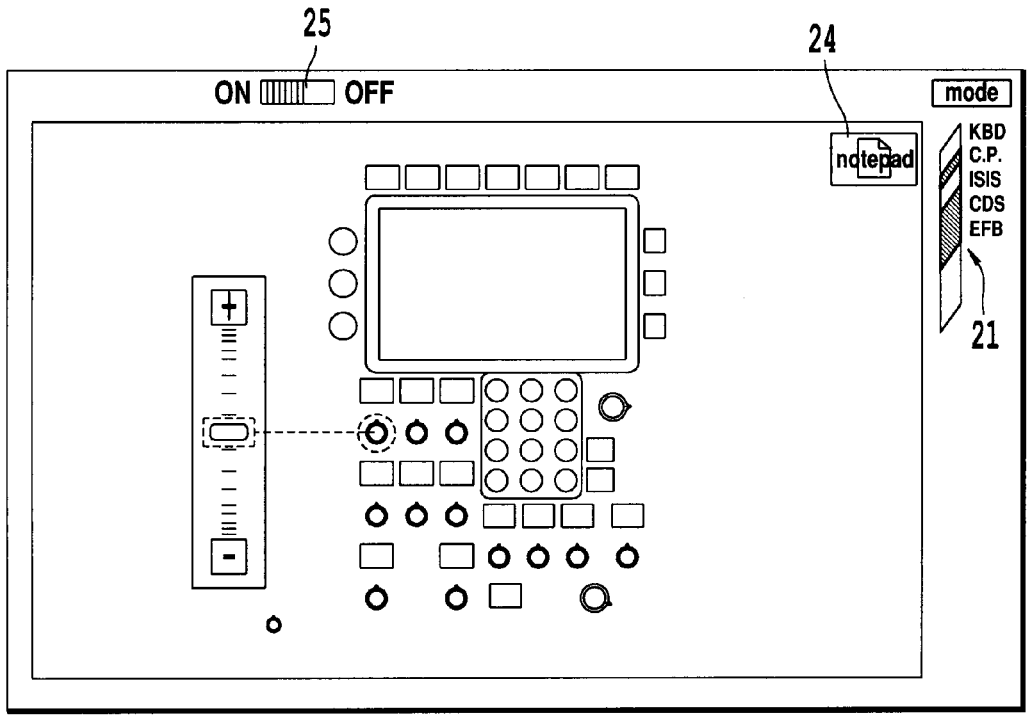

In this mode of virtual representation of a control panel, it is possible, as illustrated in FIG. 6, to have a choice among different control panels of the aircraft and to access a reproduction of one of these control panels as illustrated in FIG. 7, in particular on the occasion of loss of a particular control panel.

In practice, entry into this mode of virtual representation of a control panel is accomplished by virtue of the position of the selection button 21 on the CP index.

The choice of the virtual control panel then is made in touch-sensitive manner from the screen illustrated in FIG. 6.

Utilization of the virtual panel chosen as illustrated in FIG. 7 then is carried out by virtue of an action on the touch-sensitive screen.

By way of non-limiting example, FIG. 6 illustrates different virtual control panels, and in particular an EFIS CP panel making it possible to parametrize a graphic display of electronic navigation instruments (choice of display mode, adapted zoom and levels of information to be displayed), an AFS CP panel, offering autopilot controls, an ECAM CP panel, offering controls for the failure management system, an AESS CP panel, offering controls for the sensors for monitoring the environment of the airplane, and an RMP panel, offering controls for the radio frequency communication systems of the aircraft.

As illustrated in FIG. 7, the RMP control panel can be chosen and an action on the touch-sensitive screen makes it possible to control a radio frequency communication system of the aircraft.

In practice, the technical means making it possible to carry out this transfer of control from the physical panel to the virtual control panel consists in a direct pressing on a virtual key of the representation of the equipment, as illustrated in FIG. 7, in the same manner as if the pilot were using the real equipment.

As illustrated in FIG. 7, an adjustment interface furthermore can be displayed temporarily in order to make it possible to adjust a value associated with the virtual key actuated.

This virtual pressing then is interpreted as a real command through the RMP panel, and this command is transferred to the appropriate system according to a communication protocol defined, for example, by the ARINC standard 661.

Figure 8:
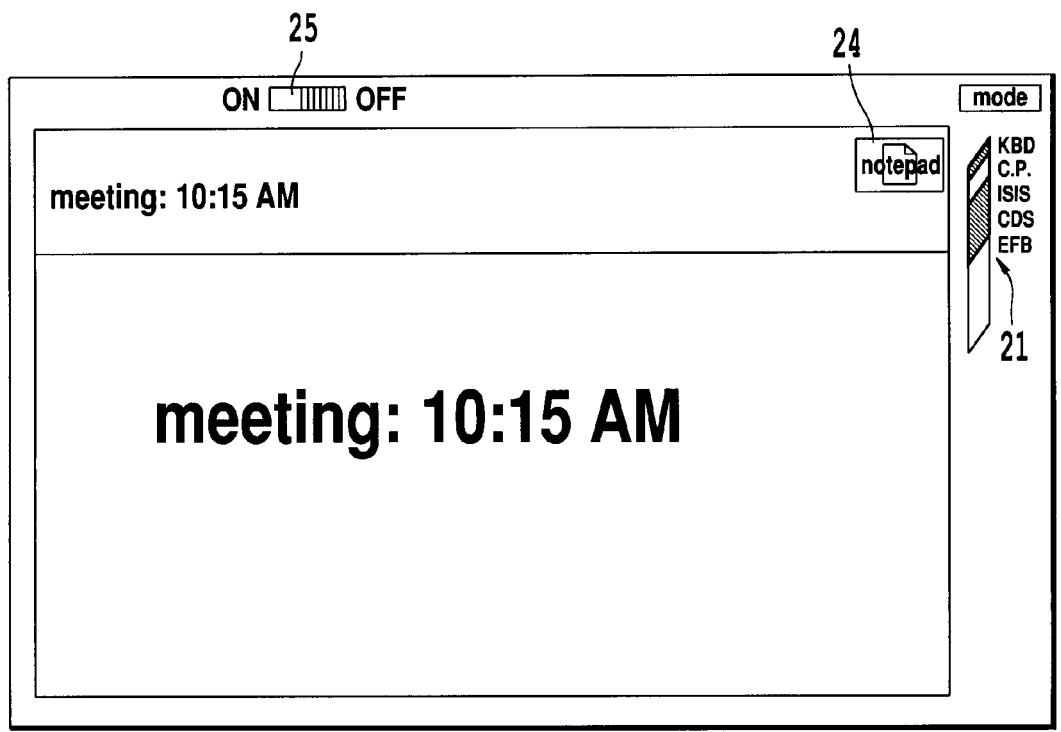
FIG. 8 illustrates the interaction device of FIG. 2, in a note-taking mode.

Furthermore, by virtue of the utilization of a touch-sensitive screen as an interaction device, the latter also can be used with a note-taking function, such as illustrated in FIG. 8, and if need be to implement a handwriting recognition function used in known manner in this type of touch-sensitive screen from the scanning of characters handwritten in particular with the aid of a stylet.

In this embodiment, the note-taking function is implemented from a virtual selection key 24 remaining accessible irrespective of the application implemented on the interaction device and making it possible, as illustrated in FIG. 8, to revert to the previously selected mode when the note-taking function is deactivated.

Of course, the note-taking function also could be accessible via a dedicated and not virtual key.

Note-taking can be performed with the aid of a finger, or else with the aid of a specific stylet. It allows recording of the note sheets, consultation thereof and modification thereof.

In known manner, a handwriting recognition function can be implemented in the interaction device, allowing translation of the notes into ASCII characters reusable within other interfaces, avionic or EFB.

The transfer of these notes transcribed in ASCII characters to other interfaces can be accomplished in standard computer manner by "copy/paste" or "send to" functions.

Furthermore, in this embodiment, the touch-sensitive screen preferably has a resolution compatible with that of the CDS or EFB avionic screens so as to be able to redisplay the avionic and EFB formats.

In this embodiment it thus is possible from time to time to consider using the touch-sensitive screen as an avionic display means, in the same way as the EFB or CDS screens arranged in the cockpit, in the event of need for information exceeding the display capacity of the avionic screens, or even in the event of loss of one or more avionic screens.

The touch-sensitive screen also can serve as a display medium for non-avionic functions, such as emergency instruments.

Figure 9:
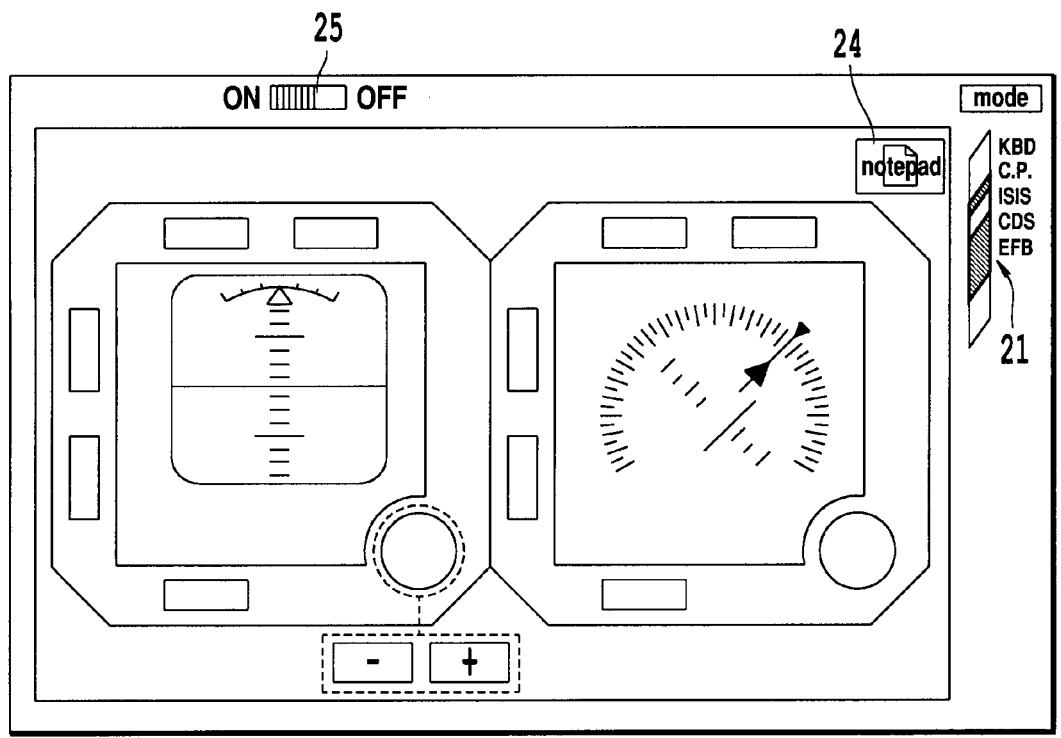
FIG. 9 illustrates the interaction device of FIG. 2, in an emergency instrumentation mode.
Figure 10:
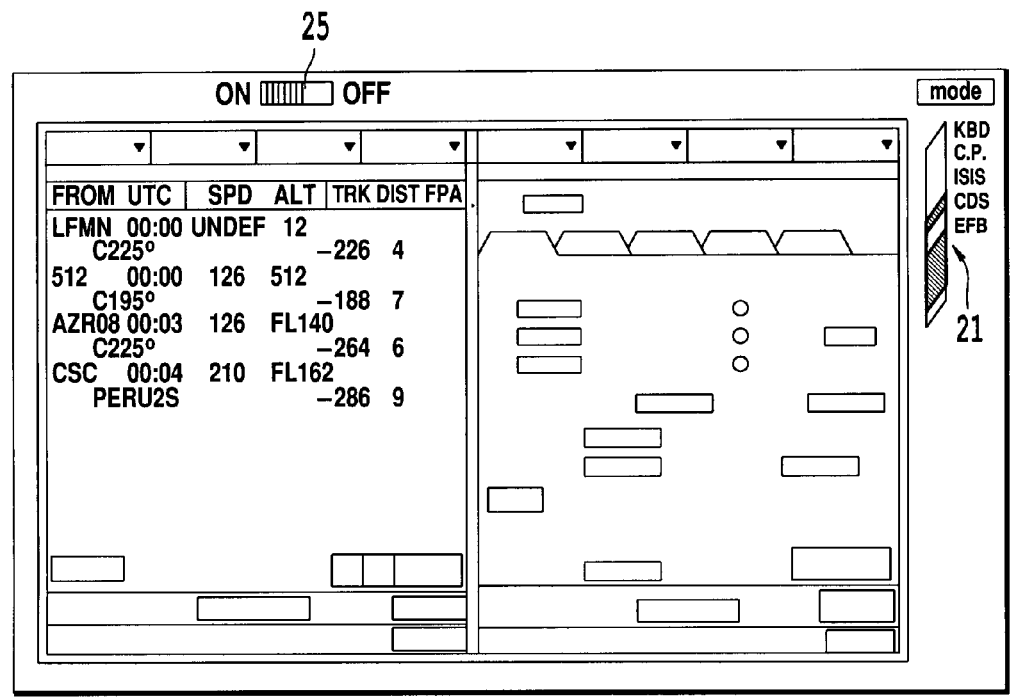
FIGS. 10 and 11 illustrate the interaction device of FIG. 2, in a display mode.
Figure 11:
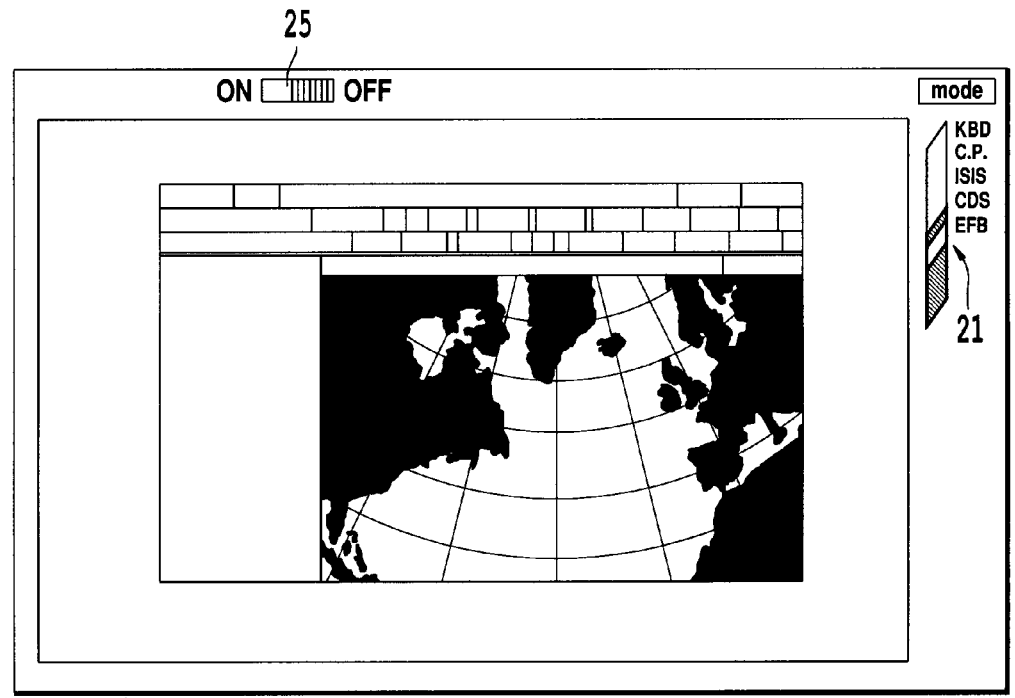

This mode of operation is illustrated on FIGS. 9 to 11.

In particular, on FIG. 9, the touch-sensitive screen 20 is used for displaying emergency instruments, by positioning the selection button 21 on the ISIS index.

In this way, on the occasion of total loss of the avionic display system, or a problem of incoherence among the data displayed with no way to clear up the uncertainty, the interaction device provides a source of independent, although more limited, information, allowing the crew to rely on an accurate display for the most essential piloting and navigation functions.

This emergency instrumentation thus is accessible directly on the touch-sensitive screen 20.

By virtue of the use of a dedicated selection button 21, it is possible to access this emergency function in the event of failure of the touch-sensitive interaction function of the interaction device.

Furthermore, on the occasion of a partial or complete loss of a display system, or when certain situations require an additional display surface for avionic functions, the interaction device can be used as a standard screen for display of avionic formats as illustrated in FIG. 10.

This type of display makes it possible to replace the CDS screen display.

There again, the selection of this use mode is accomplished by virtue of the use of a dedicated button, and here the selection button 21 positioned in front of the CDS index.

The touch-sensitive function of the screen then makes it possible to interact directly with the finger, without necessarily going through the cursor and the associated control device, by allowing an interface through the virtual screen on the most basic functions of the avionic format.

Likewise, as illustrated in FIG. 11, the touch-sensitive screen can make it possible to offer a comfortable and functional display medium to be used to replace or supplement an EFB screen.

In particular, this device can be connected to a portable computer placed at a specified location in the cockpit.

Generally, the operating systems of the Windows® type offer the user all the standard functionalities for a touch-sensitive interaction.

In this way, control of these functionalities can be performed directly through a touch-sensitive interaction on the screen of the interaction device.

This type of interaction device thus has a great modularity in use, making it possible at the same time to interact with the display systems and to replace these systems in the event of breakdown.

The previously described touch-sensitive screen moreover could be improved to use a touch-sensitive screen reciprocating-effort technology.

This type of technology can be based in known manner on a haptic technology, allowing a reciprocating effort and giving a pushing-down sensation on taking into account a pressing by the finger or with the aid of a stylet.

The contribution of this technology makes it possible to improve the ergonomics of use of this type of screens as an interaction device for the pilot, by endowing the touch-sensitive screen with sensory properties similar to a physical means of interaction.

Furthermore, when the touch-sensitive screen is adapted to take into account a pressing of the finger as well as of a stylet, it is possible to deactivate the taking into account of pressings other than a stylet so as to be able to rest the forearms on the screen or even to place different objects there without achieving involuntary entry at the interaction device. An on/off key 25 is adapted to deactivate the touch-sensitive level of the screen 20.

A specific switch can make it possible to ensure this function of deactivating pressings other than those performed by means of a specific stylet.

Of course, this invention is not limited to the previously described embodiment.

The invention claimed is:

1. A flight deck, comprising:
a display system including a plurality of display screens each configured to display a plurality of different applications and at least one cursor associated with the applications that is movable between the plurality of display screens;
an interaction device for interacting with the display system and which includes an activation unit configured to activate and control the at least one cursor and a configuration unit that automatically configures the activation unit so as to update a visual presentation and function thereof; and
at least one control panel for a flight-deck system,
wherein the interaction device includes a touch-sensitive display screen configured to, in a mode of interaction with the display system, display the cursor, the activation unit being configured automatically according to the application implemented on one of the plurality of display screens of the display system, and, in a mode of virtual representation of a control panel, for displaying a visual representation of the at least one control panel of the flight-deck system, an action on the touch-sensitive display screen configured to control the flight-deck system, wherein the touch-sensitive display screen includes a button for selection of a display and use mode chosen between the mode for interaction with the display system and the mode for virtual representation of the control panel, wherein the touch-sensitive display screen is configured to implement a note-taking function, and the note-taking function is started by selecting a virtual key that is displayed at a same position irrespective of a present application displayed, and wherein the configuration unit reconfigures the visual representation of the activation unit and the function of the activation unit.

2. The flight deck in accordance with claim 1, wherein the virtual representation of the control panel is a control panel that controls a radio frequency communication system of an aircraft.

3. The flight deck in accordance with claim 1, wherein the configuration unit is configured to choose the configuration of the activation unit from a programmable database storing a series of configurations of the activation unit associated respectively with applications of the display system.

4. The flight deck in accordance with claim 1, wherein the note-taking function includes a handwriting recognition function that translates inputted notes into ASCII characters.

5. The flight deck in accordance with claim 1, wherein the configuration unit configures the visual representation and the function associated with virtual keys of a virtual keyboard of the touch-sensitive display screen.

6. The flight deck in accordance with claim 1, wherein the touch-sensitive display screen is built into a folding shelf located beneath at least one of the plurality of display screens in a cockpit of an aircraft.

7. The flight deck in accordance with claim 1, wherein the touch-sensitive display screen includes a button for selection of a display mode, in which the touch-sensitive display screen is configured to display at least one said application on one of said screens of the display system.

8. The flight deck in accordance with claim 1, wherein the applications are chosen from among at least one electronic flight bag (EFB) format, a textual avionic format, or a graphic avionic format.

9. An aircraft, including the flight deck in accordance with claim 1.

10. The flight deck in accordance with claim 1, wherein a first display screen of said plurality of display screens functions as a control and display system (CDS) screen, and a second display screen of said plurality of display screens functions as an electronic flight bag (EFB) screen.

11. A flight deck, comprising:
an avionic display system, for a cockpit of an aircraft, including a plurality of display screens each configured to display a plurality of different applications and at least one cursor associated with the applications that is movable between the plurality of display screens;
an interaction device for interacting with the display system and which includes an activation unit configured to activate and control the at least one cursor and a configuration unit that automatically configures the activation unit so as to update a visual presentation and function thereof; and
at least one control panel including electronic flight instruments for a flight-deck system,
wherein the interaction device includes a touch-sensitive display screen configured to, in a mode of interaction with the display system, display the cursor, the activation unit being configured automatically according to the application implemented on one of the plurality of display screens of the display system, and, in a mode of virtual representation of a control panel, for displaying a visual representation of the at least one control panel of the flight-deck system including the electronic flight instruments, an action on the touch-sensitive display screen configured to control the flight-deck system,
wherein the touch-sensitive display screen includes a button for selection of a display and use mode chosen between the mode for interaction with the display system and the mode for virtual representation of the control panel including the electronic flight instruments,
wherein the touch-sensitive display screen is configured to implement a note-taking function, and the note-taking function is started by selecting a virtual key that is displayed at a same position irrespective of a present application displayed, and
wherein the configuration unit reconfigures the visual representation of the activation unit and the function of the activation unit.

12. The flight deck in accordance with claim 11, wherein the touch-sensitive display screen is built into a folding shelf located beneath at least one of the plurality of display screens in a cockpit of an aircraft.

13. A flight deck, comprising:
a display system including a plurality of display screens each configured to display a plurality of different applications and a cursor associated with the applications that is movable between the plurality of display screens; and
an interaction device including a touch-sensitive display screen for interacting with the display system and which includes an activation unit configured to activate and control the cursor, and a configuration unit that automatically re-configures the activation unit based on a determination that one of the applications displayed on one of the display screens is an active application when the cursor is positioned on said one display screen displaying said one application, so as to update a visual presentation and a function of the activation unit,
wherein the touch-sensitive display screen is reconfigurable by updating different virtual key configurations displayed thereon responsive to the determination that one of the applications displayed on said one of the display screens is the active application when the cursor is positioned on said one display screen displaying said one application.

* * * * *